Figure 1:
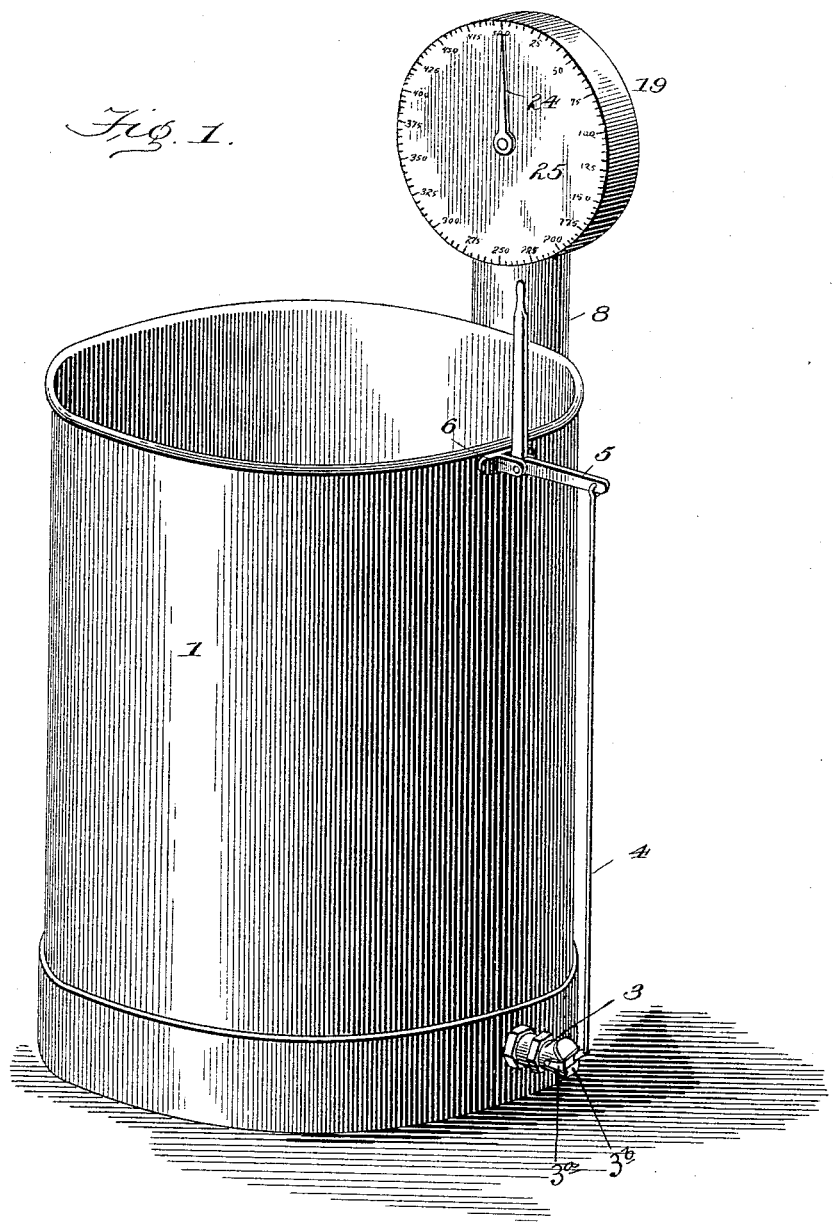

No. 616,594. Patented Dec. 27, 1898.
C. H. VAN ALSTYNE.
SELF MEASURING MILK CAN.
(Application filed Jan. 24, 1898.)

(No Model.) 2 Sheets—Sheet 1.

WITNESSES:
C. C. Hines
Edwin L. Bradford

INVENTOR:
C. H. Van Alstyne,
BY R. & A. B. Lacey,
ATTORNEYS.

No. 616,594. Patented Dec. 27, 1898.
C. H. VAN ALSTYNE.
SELF MEASURING MILK CAN.
(Application filed Jan. 24, 1898.)
(No Model.) 2 Sheets—Sheet 2.
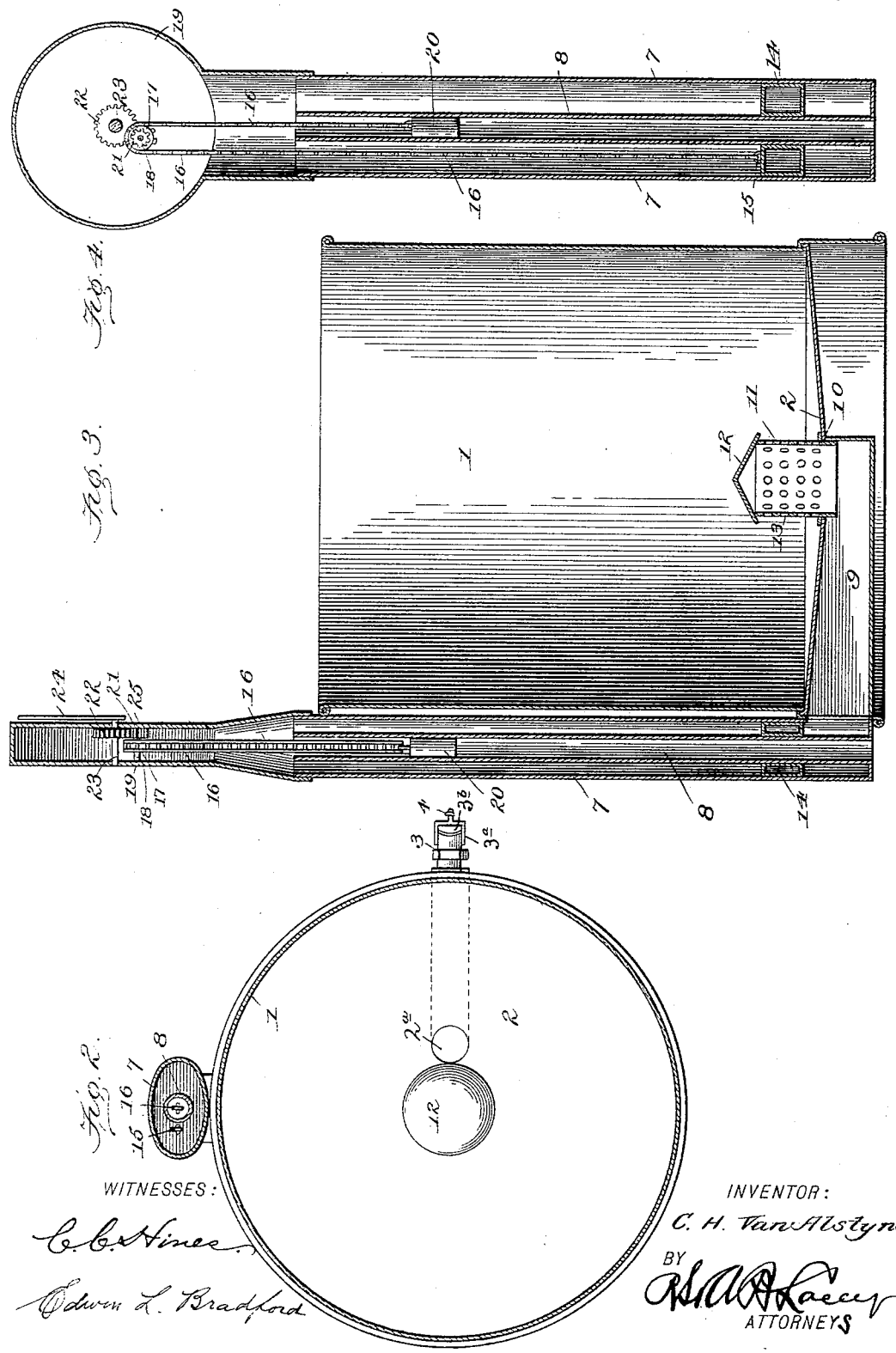
WITNESSES:
C. C. Hines
Edwin L. Bradford
INVENTOR:
C. H. Van Alstyne,
BY
ATTORNEYS
THE NORRIS PETERS CO., PHOTO-LITHO., WASHINGTON, D. C.

UNITED STATES PATENT OFFICE.

CHARLES H. VAN ALSTYNE, OF MANCHESTER, IOWA.

SELF-MEASURING MILK-CAN.

SPECIFICATION forming part of Letters Patent No. 616,594, dated December 27, 1898.

Application filed January 24, 1898. Serial No. 667,806. (No model.)

*To all whom it may concern:*

Be it known that I, CHARLES H. VAN ALSTYNE, a citizen of the United States, residing at Manchester, in the county of Delaware and State of Iowa, have invented certain new and useful Improvements in Self-Measuring Milk-Cans; and I do hereby declare the following to be a full, clear, and exact description of the invention, such as will enable others skilled in the art to which it appertains to make and use the same.

My invention relates to self-measuring milk-cans; and the object is to provide a simple and reliable receiving-can for creameries and the like for ascertaining the exact quantity of each parcel or lot of milk left by each producer without the necessity of gaging each parcel or lot separately.

To this end the novelty consists in the construction, combination, and arrangement of parts, as will be hereinafter more fully described, and particularly pointed out in the claim.

In the accompanying drawings the same reference characters or numerals indicate the same parts of the invention.

Figure 1 is a perspective view of my improved self-measuring milk-can. Fig. 2 is a horizontal section. Fig. 3 is a vertical section. Fig. 4 is a similar view through the float guide-tube.

1 represents the cylindrical can, open at the top and provided with an inverted conical or concave bottom 2.

3 represents a side lever-faucet provided with the pivoted yoke 3ª, carrying a valve 3ᵇ, and connected with a rod 4, the upper end of which is pivoted to a hand-lever 5, fulcrumed in a bracket 6, for conveniently manipulating the faucet from the top of the can.

2ª represents a discharge conductor-trough leading from the center of the bottom 2 to the faucet, which communicates with the interior of the can at a point below the level of the said bottom 2.

7 represents a vertical float-tube elliptical in cross-section and fixed to the outside of the can.

8 represents the cylindrical guide-tube, concentrically fixed within the float-tube 7. The lower end of the float-tube 7 is connected to the outer end of a radial pipe 9, which communicates with a central orifice 10 in the lowermost point of the conical bottom 2.

11 represents a hood removably secured in the orifice 10 in the bottom 2, and it is provided with a conical top 12 and a foraminous wall 13, through which the liquid in the can is permitted to seek its level in the tube 7 in a regular and even manner and not spasmodically, as would be the case if the orifice 10 were unobstructed.

14 represents a float which encompasses the guide-tube 8, so as to have a free vertical movement in the float-tube 7, and it is provided with a staple 15, to which is fixed the lower end of a sprocket-chain 16, which extends upwardly over a sprocket-wheel 17 on a shaft 18, journaled in the dial-case 19, and thence downward through the cylindrical guide-tube 8, its lower end being provided with a counterbalancing-weight 20. The shaft 18 is also provided with a pinion 21, which meshes with a gear-wheel 22, fixed on a shaft 23, centrally journaled in the case 19, and 24 represents a pointer or indicator-hand fixed on the projecting end of said shaft, which traverses a scale on the face of the dial 25, so that a given quantity of fluid in the can will be accurately indicated by the pointer on the dial. It will also be observed that when said pointer indicates the quantity of fluid in the can and an additional quantity be added the difference between the first and second readings of the dial will determine the volume added, so that a series of quantities added to the contents of the can can be ascertained with precision without the care and labor involved in weighing or measuring each lot or parcel separately.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

In a self-measuring milk-can, the combination of a can-body provided with a discharge-faucet and an inverted conical or concaved bottom having an opening at the center thereof, a discharge-trough communicating with the interior of the can through said opening and leading therefrom to the faucet, a hood provided with a conical top and foraminous wall detachably secured in said central opening, a vertical float-tube arranged wholly on the exterior of the can, a guide-tube inclosed within said float-tube, a radial pipe below the concave bottom extending from the hood to and opening through the wall of the can into the lower end of the float-tube, a dial-casing arranged on the upper end of the float-tube, an indicator-shaft mounted therein carrying a pointer and a gear-wheel, a second shaft also mounted therein and carrying a pinion meshing with said gear-wheel and a sprocket-wheel, a float encompassing the guide-tube, and a chain passed over said sprocket-wheel, secured at one end to the float and carrying at its other end a counterweight which moves in the said guide-tube, substantially as described.

In testimony whereof I affix my signature in presence of two witnesses.

CHARLES H. VAN ALSTYNE.

Witnesses:
   W. C. GREGORY,
   WALTER C. GREGORY, Jr.